(12) United States Patent
Satou et al.

(10) Patent No.: US 12,240,498 B2
(45) Date of Patent: Mar. 4, 2025

(54) VEHICLE CONTROL SYSTEM, VEHICLE CONTROL METHOD, AND STORAGE MEDIUM

(71) Applicant: TOYOTA JIDOSHA KABUSHIKI KAISHA, Toyota (JP)

(72) Inventors: Kunihito Satou, Mishima Shizuoka-ken (JP); Takayuki Iwamoto, Sunto-gun Shizuoka-ken (JP); Takefumi Goto, Gotemba Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 331 days.

(21) Appl. No.: 17/858,134

(22) Filed: Jul. 6, 2022

(65) Prior Publication Data

US 2023/0027357 A1 Jan. 26, 2023

(30) Foreign Application Priority Data

Jul. 26, 2021 (JP) ................................. 2021-121630

(51) Int. Cl.
*B60W 60/00* (2020.01)
*B60W 50/02* (2012.01)

(52) U.S. Cl.
CPC ... *B60W 60/00186* (2020.02); *B60W 2420/50* (2013.01); *B60W 2556/40* (2020.02)

(58) Field of Classification Search
CPC .... G05D 1/0263; G05D 1/0261; G05D 1/028; G05D 1/0229; G05D 1/0244; G05D 2201/0216; B60W 2420/50; B60W 60/00186; B60W 50/0225; B60W 2050/021; B60W 2050/0215; B60W 2556/40; G05B 19/41895; G08G 1/042
See application file for complete search history.

(56) References Cited

U.S. PATENT DOCUMENTS

| | | | |
|---|---|---|---|
| 2016/0121906 A1 | 5/2016 | Matsuno et al. | |
| 2016/0132705 A1* | 5/2016 | Kovarik | G01S 13/74 340/10.3 |
| 2022/0073062 A1* | 3/2022 | Gariepy | B60W 30/182 |
| 2022/0340202 A1* | 10/2022 | Yamamoto | G01C 21/165 |
| 2024/0010189 A1* | 1/2024 | Yamamoto | G08G 1/143 |

FOREIGN PATENT DOCUMENTS

| | | | | |
|---|---|---|---|---|
| JP | 2016-088180 A | | 5/2016 | |
| KR | 20110039624 A | * | 4/2011 | ............ B60W 30/00 |

* cited by examiner

*Primary Examiner* — Khoi H Tran
*Assistant Examiner* — Tanner L Cullen
(74) *Attorney, Agent, or Firm* — Dinsmore & Shohl LLP

(57) ABSTRACT

A vehicle control system is applied to a vehicle equipped with a magnetic sensor configured to detect a magnetic marker on a road. The vehicle control system executes a self-driving control by which self-driving of the vehicle is controlled. The vehicle control system executes a retreat traveling control using the magnetic marker in response to the occurrence of an abnormality in at least part of components and functions necessary for the self-driving control. The magnetic marker provides guidance information by which the vehicle is guided to a safe area. In the retreat traveling control using the magnetic marker, the vehicle control system acquires the guidance information from the magnetic marker detected by the magnetic sensor and causes the vehicle to travel toward the safe area and stop at the safe area based on the guidance information thus acquired.

9 Claims, 10 Drawing Sheets

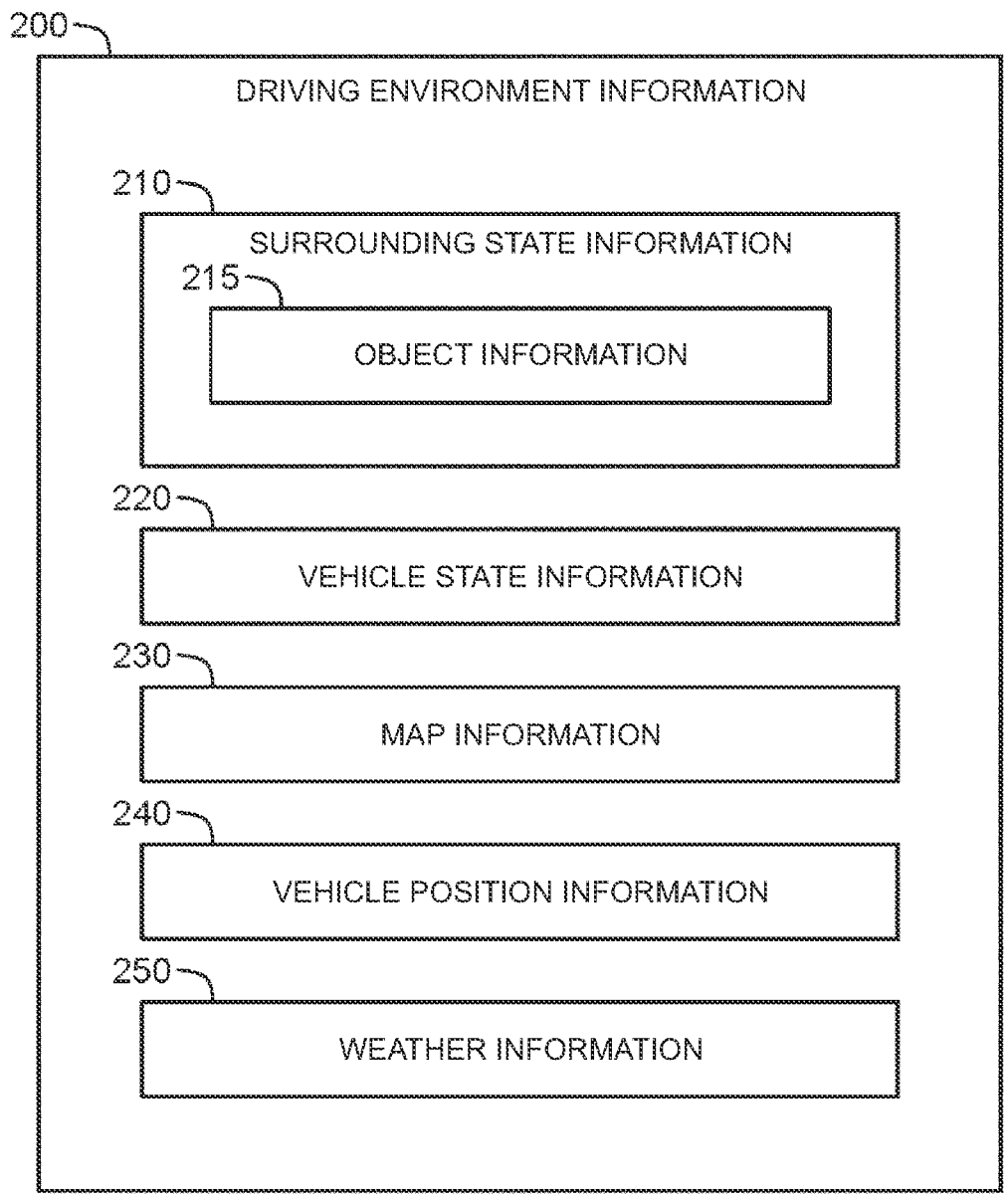

VEHICLE CONTROL SYSTEM, VEHICLE CONTROL METHOD, AND STORAGE MEDIUM

CROSS-REFERENCE TO RELATED APPLICATION

This application claims priority to Japanese Patent Application No. 2021-121630 filed on Jul. 26, 2021, incorporated herein by reference in its entirety.

BACKGROUND

1. Technical Field

This disclosure relates to a vehicle control technology for controlling a vehicle. Particularly, this disclosure relates to retreat traveling for a vehicle to retreat to a safe area.

2. Description of Related Art

Japanese Unexamined Patent Application Publication No. 2016-088180 (JP 2016-088180 A) describes a traveling control device for a vehicle. The traveling control device acquires traveling environmental information and vehicle traveling information and executes a self-driving control based on the traveling environmental information and the vehicle traveling information. In a case where an abnormality is detected in the acquisition of the traveling environmental information, the traveling control device executes a retreat control such that the vehicle retreats to the roadside. In the retreat control, the traveling control device sets a retreat route based on last traveling environmental information and last vehicle traveling information acquired before the abnormality is detected. Then, the traveling control device executes a self-driving control such that the vehicle travels along the retreat route and retreats to the roadside.

SUMMARY

In a case where an abnormality occurs in a vehicle during self-driving, it is conceivable to perform retreat traveling such that the vehicle retreats to a safe area. However, since the vehicle has an abnormality, it might be difficult to sufficiently acquire performance or information necessary for retreat traveling. In a case where the performance or information necessary for the retreat traveling is not acquired sufficiently, the accuracy of the retreat traveling decreases. For example, in a case where a recognition sensor configured to recognize a surrounding state around the vehicle partially breaks down, recognition performance decreases, so that the accuracy of a process of specifying a vehicle position decreases. In a case where highly accurate vehicle position information is not acquired, the accuracy of the retreat traveling decreases.

One object of this disclosure is to provide a technology that can improve the accuracy of retreat traveling to be performed when an abnormality occurs in a vehicle during self-driving.

A first aspect relates to a vehicle control system. The vehicle control system is applied to a vehicle equipped with a magnetic sensor configured to detect a magnetic marker on a road. The vehicle control system includes one or more processors configured to execute a self-driving control by which self-driving of the vehicle is controlled. In response to the occurrence of an abnormality in at least part of components and functions necessary for the self-driving control, the one or more processors execute a retreat traveling control using the magnetic marker. The magnetic marker provides guidance information by which the vehicle is guided to a safe area. In the retreat traveling control using the magnetic marker, the one or more processors acquire the guidance information from the magnetic marker detected by the magnetic sensor and cause the vehicle to travel toward the safe area and stop at the safe area based on the guidance information thus acquired.

A second aspect relates to a vehicle control method for controlling a vehicle equipped with a magnetic sensor configured to detect a magnetic marker on a road. The vehicle control method includes: a process of executing a self-driving control by which self-driving of the vehicle is controlled; and a process of executing a retreat traveling control using the magnetic marker in response to occurrence of an abnormality in at least part of components and functions necessary for the self-driving control. The magnetic marker provides guidance information by which the vehicle is guided to a safe area. The retreat traveling control using the magnetic marker includes: a process of acquiring the guidance information from the magnetic marker detected by the magnetic sensor; and a process of causing the vehicle to travel toward the safe area and stop at the safe area based on the guidance information thus acquired.

A third aspect relates to a storage medium storing a vehicle control program to be executed by a computer, the vehicle control program being for controlling a vehicle equipped with a magnetic sensor configured to detect a magnetic marker on a road. The vehicle control program causes the computer to execute: a process of executing a self-driving control by which self-driving of the vehicle is controlled; and a process of executing a retreat traveling control using the magnetic marker in response to occurrence of an abnormality in at least part of components and functions necessary for the self-driving control. The magnetic marker provides guidance information by which the vehicle is guided to a safe area. The retreat traveling control using the magnetic marker includes: a process of acquiring the guidance information from the magnetic marker detected by the magnetic sensor; and a process of causing the vehicle to travel toward the safe area and stop at the safe area based on the guidance information thus acquired.

In this disclosure, retreat traveling using a magnetic marker is performed. The magnetic marker provides guidance information by which a vehicle is guided to a safe area. By use of a magnetic sensor provided in the vehicle, the vehicle can detect the magnetic marker and acquire the guidance information. Then, the vehicle can travel toward the safe area and stop at the safe area based on the acquired guidance information. Even in a case where an abnormality is detected in at least part of components and functions necessary for the self-driving control, it is possible to improve the accuracy of retreat traveling by executing a retreat traveling control using the magnetic marker.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 7 is a block diagram illustrating an example of driving environment information according to the embodiment of this disclosure;

FIG. 8 is a schematic diagram illustrating an example of guidance information according to the embodiment of this disclosure;

DETAILED DESCRIPTION OF EMBODIMENTS

The following describes an embodiment of this disclosure with reference to the attached drawings.

1. Outline

Figure 1:
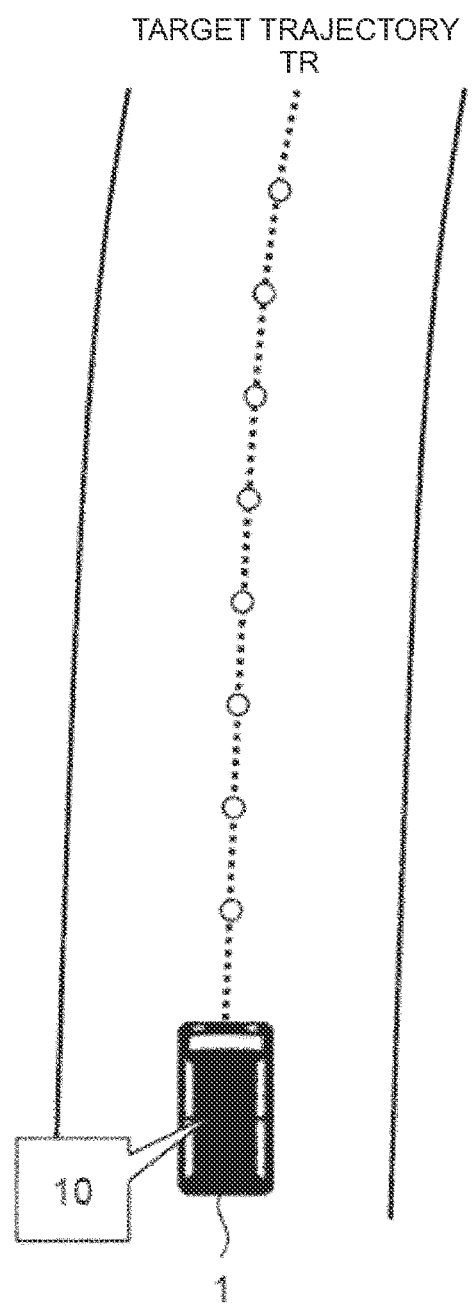
FIG. 1 is a schematic diagram to describe the outline of a vehicle control system according to an embodiment of this disclosure.

FIG. 1 is a schematic diagram to describe the outline of a vehicle control system 10 to be applied to a vehicle 1 according to the present embodiment. The vehicle control system 10 controls the vehicle 1. Typically, the vehicle control system 10 is provided in the vehicle 1. Alternatively, the vehicle control system 10 may be at least partially included in a remote system outside the vehicle 1 and may remotely control the vehicle 1. That is, the vehicle control system 10 may be arranged in the vehicle 1 and the remote system in a distributed manner.

The vehicle 1 is a vehicle that is drivable by self-driving. Here, the self-driving is assumed to be performed on the premise that a driver does not necessarily fully concentrate on driving (e.g., self-driving of so-called Level 3 or more). The vehicle 1 may be a self-driving vehicle of Level 4 or more. The vehicle 1 may be a driverless self-driving vehicle.

The vehicle control system 10 executes a "self-driving control" by which self-driving of the vehicle 1 is controlled. For example, the vehicle control system 10 performs a recognition process of recognizing a surrounding state around the vehicle 1 by use of a recognition sensor provided in the vehicle 1. The vehicle control system 10 executes the self-driving control based on a result of the recognition process.

In the self-driving control, a target trajectory TR is typically used. The target trajectory TR includes a target position and a target speed of the vehicle 1 in a road where the vehicle 1 travels. The vehicle control system 10 generates the target trajectory TR and executes a vehicle traveling control such that the vehicle 1 follows the target trajectory TR.

Assume a case where an abnormality (failure) occurs in the vehicle 1 during self-driving. Particularly, assume a case where at least part of components and functions necessary for the self-driving control has an abnormality. In that case, performance (recognition performance) of the recognition process and maneuverability are restricted, so that self-driving may be difficult to be performed as intended. Therefore, it is conceivable to perform "retreat traveling" in response to the occurrence of the abnormality such that the vehicle 1 retreats to a safe place.

Figure 2:
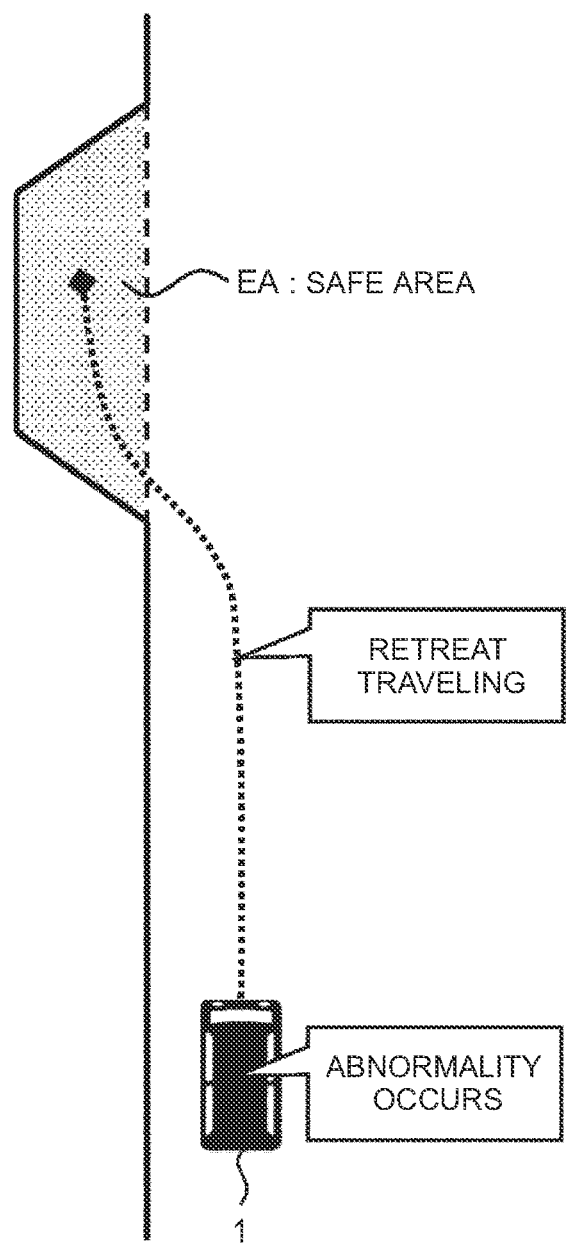
FIG. 2 is a schematic diagram to describe retreat traveling.

FIG. 2 is a schematic diagram to describe retreat traveling. A safe area EA is an area used for retreat of the vehicle 1. The safe area EA may be determined in advance. For example, the safe area EA is provided in a shoulder of the road. In the retreat traveling, the vehicle control system 10 recognizes a current position of the vehicle 1 and a nearest safe area EA and controls the vehicle 1 such that the vehicle 1 travels toward the safe area EA and stops at the safe area EA. For example, the vehicle control system 10 determines a retreat route and a target trajectory TR to the safe area EA based on the current position of the vehicle 1 and the position of the safe area EA. The vehicle control system 10 controls the vehicle 1 such that the vehicle 1 travels along the retreat route and the target trajectory TR.

However, in a case where an abnormality occurs in the vehicle 1, performance or information necessary for retreat traveling may not be acquired sufficiently. In a case where the performance or information necessary for the retreat traveling is not acquired sufficiently, the accuracy of the retreat traveling decreases. For example, in a case where a recognition sensor configured to recognize the surrounding state around the vehicle 1 partially breaks down, recognition performance decreases, so that the accuracy of a process of specifying the vehicle position decreases. In a case where highly accurate vehicle position information is not acquired, the accuracy of the retreat traveling decreases.

In view of this, according to the present embodiment, retreat traveling based on a new technique is proposed. In the new retreat traveling, a "magnetic marker M" provided (laid) on the road is used.

Figure 3:
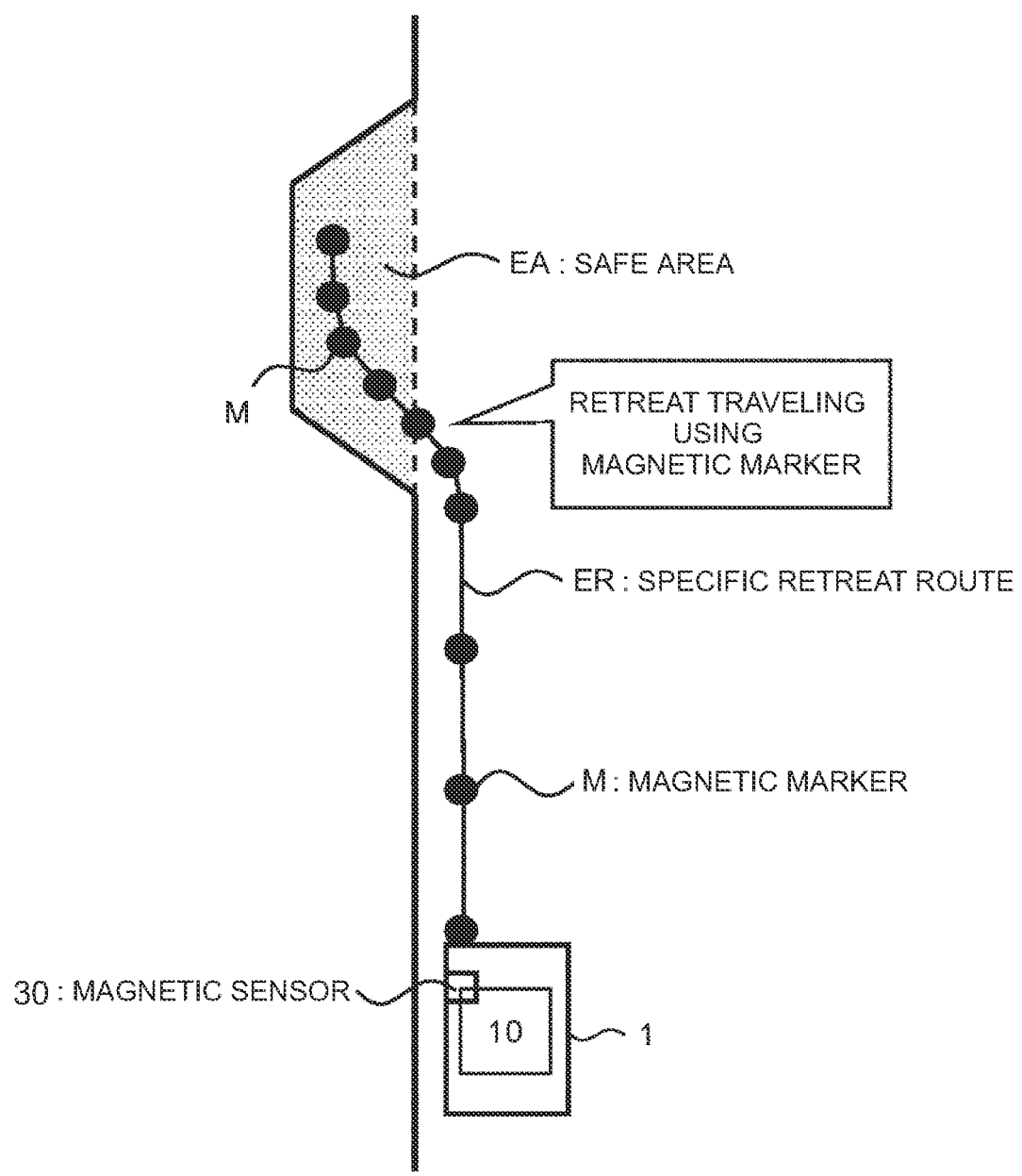
FIG. 3 is a schematic diagram to describe retreat traveling using magnetic markers according to the embodiment of this disclosure.

FIG. 3 is a schematic diagram to describe retreat traveling using the magnetic marker M. A plurality of magnetic markers M is provided (laid) on the road. For example, the magnetic markers M are provided intermittently along a specific retreat route ER. The specific retreat route ER is a model retreat route led to a predetermined safe area EA and is determined in advance. In a case where the magnetic markers M are provided along the specific retreat route ER, it may be said that the set of respective installation positions of the magnetic markers M indicates the specific retreat route ER. However, the specific retreat route ER is not necessary.

The magnetic marker M includes a magnet and a radio frequency (RF) tag. In the RF tag of the magnetic marker M, "guidance information 300" by which the vehicle 1 is guided to the safe area EA is stored, and the RF tag provides the guidance information 300. For example, the guidance information 300 includes the installation position of the magnetic marker M. As another example, the guidance information 300 may include an advancing direction and a distance from the installation position of the magnetic marker M to the safe area EA.

A magnetic sensor 30 is provided in the vehicle 1. The magnetic sensor 30 is provided in the vehicle 1 such that the magnetic sensor 30 can detect the magnetic marker M on the road. Further, the magnetic sensor 30 includes a reader that is wirelessly communicable with the RF tag and can read the guidance information 300 from the RF tag. By use of the magnetic sensor 30, the vehicle control system 10 detects the magnetic marker M and acquires the guidance information 300 from the RF tag of the detected magnetic marker M.

The vehicle control system 10 executes a "retreat traveling control" based on the guidance information 300 acquired from the detected magnetic marker M. More particularly, the vehicle control system 10 causes the vehicle 1 to travel toward the safe area EA and stop at the safe area EA based on the acquired guidance information 300. For example, in a case where the guidance information 300 includes the installation position of the magnetic marker M, the vehicle control system 10 can highly accurately specify the position of the vehicle 1 based on the installation position of the detected magnetic marker M. The vehicle control system 10 can accurately execute the retreat traveling control based on map information indicative of the highly accurate vehicle position and the position of the safe area EA. As another example, in a case where the guidance information 300 includes the advancing direction and the distance from the installation position of the magnetic marker M to the safe area EA, the vehicle control system 10 can accurately execute the retreat traveling control based on the advancing direction and the distance to the safe area EA.

In a case where the magnetic marker M is detected by the magnetic sensor 30, a lateral position deviation between the magnetic sensor 30 and the magnetic marker M can be found from the direction of the magnetic marker M viewed from the magnetic sensor 30. The vehicle control system 10 may steer the vehicle 1 to a direction where the lateral position deviation decreases. Hereby, it is possible to cause the vehicle 1 to follow the magnetic marker M with accuracy.

As described above, in the present embodiment, the retreat traveling control using the magnetic marker M is executed. The magnetic marker M provides the guidance information 300 by which the vehicle 1 is guided to the safe area EA. By use of the magnetic sensor 30 provided in the vehicle 1, the vehicle 1 can detect the magnetic marker M and acquire the guidance information 300. Then, the vehicle 1 can travel toward the safe area EA and stop at the safe area EA based on the acquired guidance information 300. Even in a case where an abnormality is detected in at least part of the components and the functions necessary for the self-driving control, it is possible to improve the accuracy of retreat traveling by executing the retreat traveling control using the magnetic marker M. This is useful from the viewpoint of securing of safety.

In an urban area, such a case is considered that only a small safe area EA can be secured. For example, in a situation where the recognition performance has decreased, it is difficult to highly accurately specify the vehicle position based on a recognition result. In a situation where highly accurate vehicle position information cannot be acquired, it is difficult to cause the vehicle 1 to retreat to the small safe area EA with accuracy. Even in such a situation, by performing retreat traveling using the magnetic marker M, it is possible to cause the vehicle 1 to retreat to the small safe area EA with accuracy.

The following more specifically describes the magnetic marker M and the vehicle control system 10 according to the present embodiment.

2. Installation Example of Magnetic Marker

Figure 4:
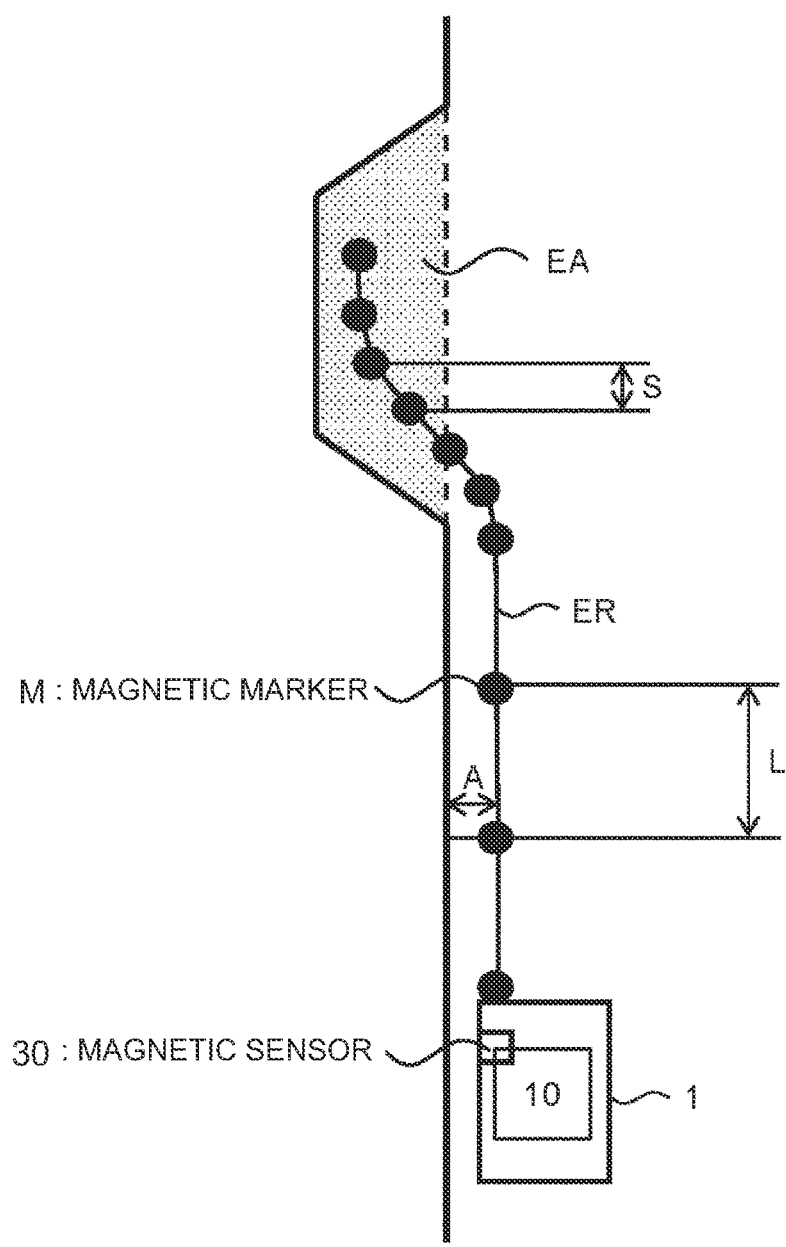
FIG. 4 is a schematic diagram to describe an installation example of the magnetic markers according to the embodiment of this disclosure.

FIG. 4 is a schematic diagram to describe an installation example of the magnetic markers M. The magnetic markers M are provided (laid) on the road. The magnetic markers M may be provided over the whole single town such as a smart city. In the example illustrated in FIG. 4, the magnetic markers M are provided intermittently along the specific retreat route ER. The specific retreat route ER is a model retreat route led to a predetermined safe area EA and is determined in advance.

The magnetic markers M may be thickly provided inside and around the safe area EA where the vehicle 1 stops. In the example illustrated in FIG. 4, an installation interval S between the magnetic marker M inside and around the safe area EA is smaller than an installation interval L between the magnetic marker M on the road other than the above area. Hereby, the accuracy of the retreat traveling control inside and around the safe area EA is particularly improved.

The magnetic markers M may be provided at a position near a roadway end instead of a lane center. That is, a distance A between the roadway end and the magnetic marker M may be smaller than a distance between the roadway end and the lane center. The distance A may vary depending on the type of road. In an area of the left-hand traffic, the magnetic markers M are provided on the left side in the advancing direction from the lane center. Along with this, in some embodiments, the magnetic sensor 30 may be also provided on the left side of the vehicle 1, as illustrated in FIG. 4. For example, the magnetic sensor 30 is provided in a part in front of the left front wheel in the vehicle 1. The magnetic sensor 30 is not provided on the right side of the vehicle 1. This allows the vehicle 1 to easily travel along the roadway end, so that the vehicle 1 can easily retreat to the safe area EA present on the left side of the roadway. An area of the right-hand traffic has a configuration reverse to the above configuration. When the above description is generalized, in some embodiments, the magnetic sensor 30 may be provided only on a first side of the vehicle 1. The first side is the left side in the area of the left-hand traffic, and the first side is the right side in the area of the right-hand traffic.

Figure 5:
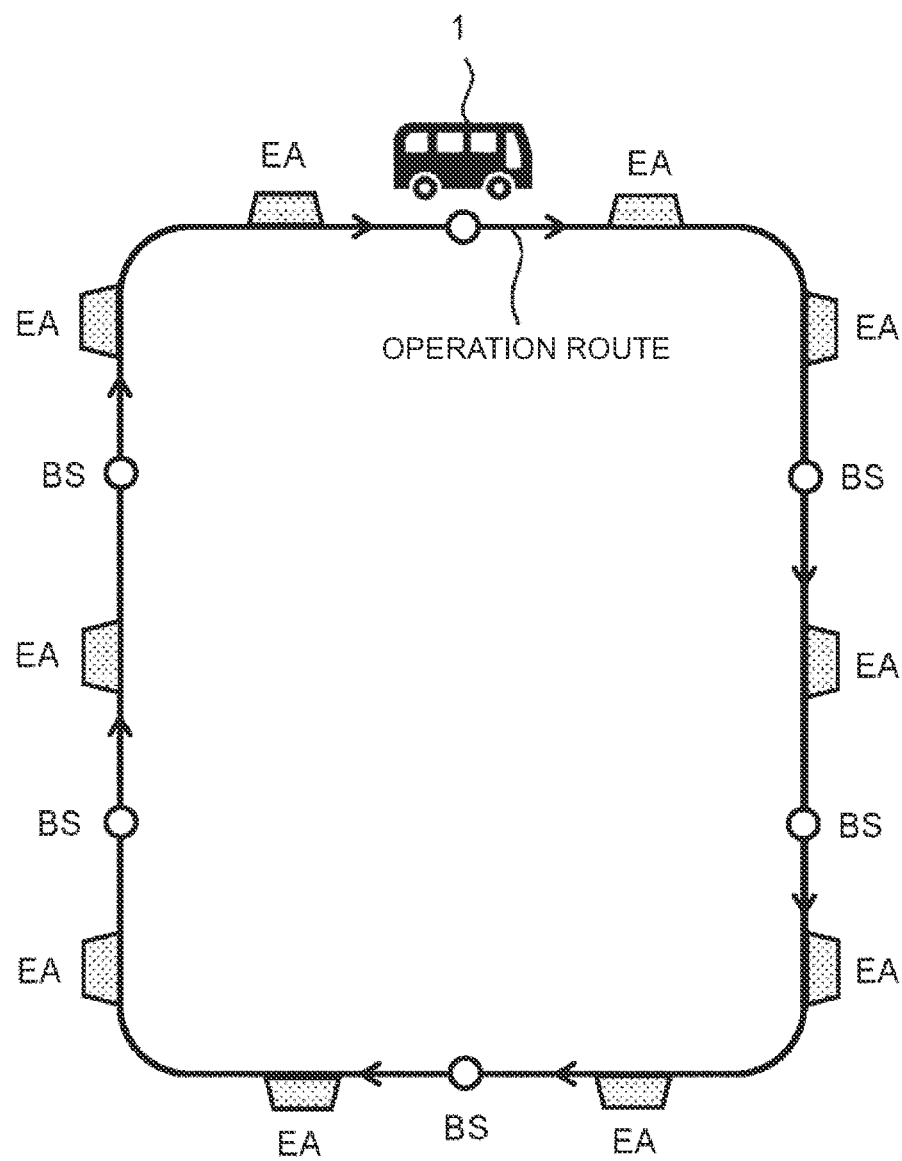
FIG. 5 is a schematic diagram to describe an arrangement example of a safe area according to the embodiment of this disclosure.

FIG. 5 is a schematic diagram to describe an arrangement example of the safe area EA. In the example illustrated in FIG. 5, the vehicle 1 is a self-driving bus. The self-driving bus travels along a predetermined operation route. Bus stops BS are present on the operation route. The safe area EA is provided in an area between the bus stops BS. The safe areas EA may be equally provided in the area between the bus stops BS. Along the operation route, the magnetic markers M are provided. As described above, the magnetic markers M may be thickly provided inside and around the safe area EA.

3. Example of Vehicle Control System 3-1. Exemplary Configuration

Figure 6:
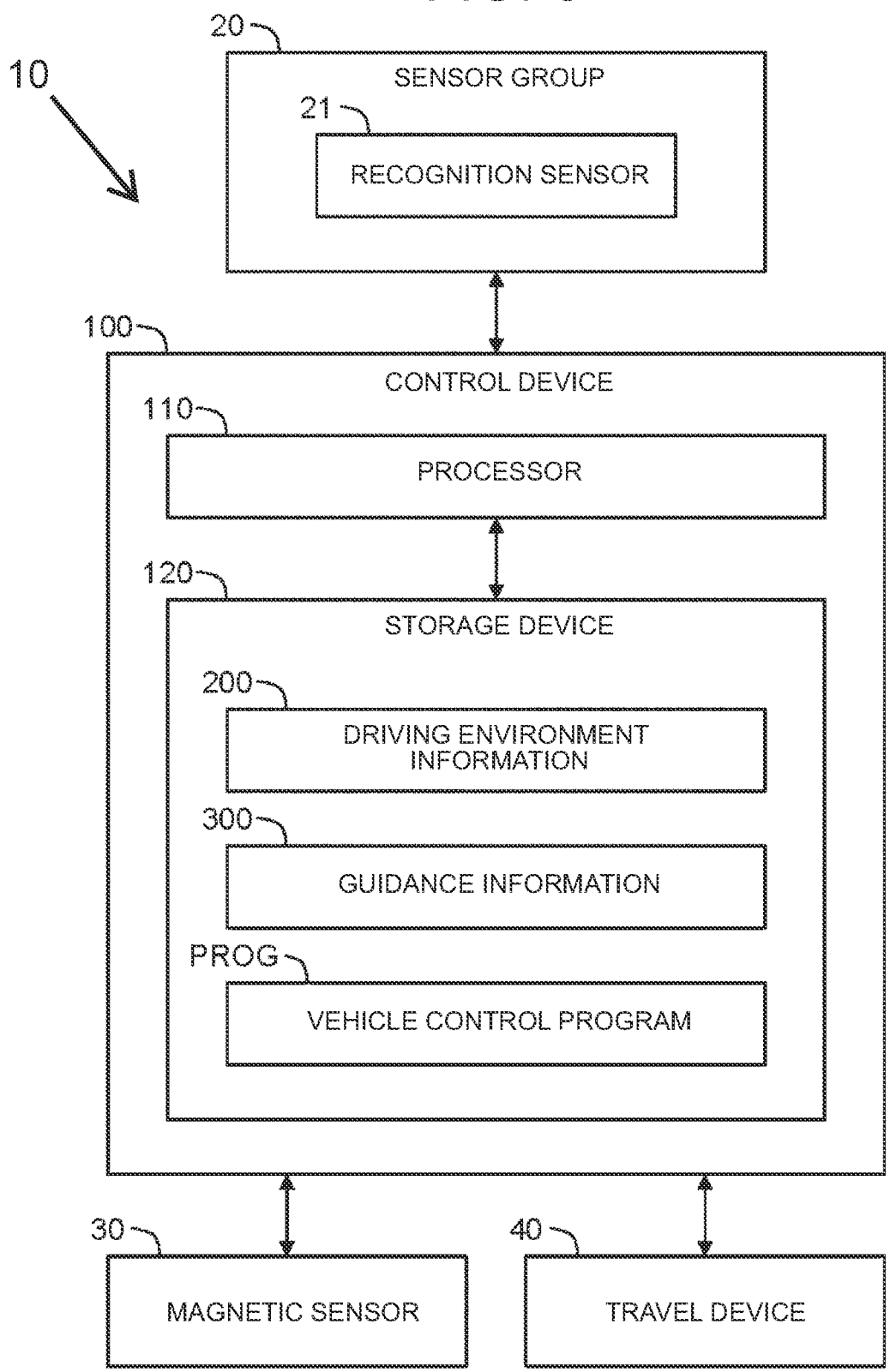
FIG. 6 is a block diagram illustrating an exemplary configuration of the vehicle control system according to the embodiment of this disclosure.

FIG. 6 is a block diagram illustrating an exemplary configuration of the vehicle control system 10 according to the present embodiment. The vehicle control system 10 includes a sensor group 20, a magnetic sensor 30, a travel device 40, and a control device 100.

The sensor group 20 is provided in the vehicle 1. The sensor group 20 includes a recognition sensor (external sensor) 21 configured to recognize a surrounding state around the vehicle 1. Examples of the recognition sensor 21 include a camera, a laser imaging detection and ranging (LIDAR) system, a radar, and the like. The recognition sensor 21 may have a dual configuration (redundant configuration).

Further, the sensor group 20 includes a vehicle state sensor configured to detect a state of the vehicle 1. The vehicle state sensor includes a speed sensor, an acceleration sensor, a yaw rate sensor, a steering angle sensor, and so on.

Further, the sensor group 20 includes a position sensor configured to detect a position and a direction of the vehicle 1. The position sensor is, for example, a global positioning system (GPS) sensor. Each sensor may have a dual configuration (redundant configuration).

The magnetic sensor 30 is provided in the vehicle 1. The magnetic sensor 30 detects the magnetic marker M on the road. Further, the magnetic sensor 30 includes a reader that is wirelessly communicable with the RF tag included in the magnetic marker M.

The travel device 40 is provided in the vehicle 1. The travel device 40 includes a steering device, a driving device, and a braking device. The steering device turns wheels. For example, the steering device includes a power steering (electric power steering (EPS)) device. The driving device is a power source configured to generate driving force. Examples of the driving device include an engine, an electric machine, an in-wheel type motor, and the like. The braking device generates braking force.

The control device 100 controls the vehicle 1. The control device 100 includes one or more processors 110 (hereinafter just referred to as the processor 110) and one or more storage devices 120 (hereinafter just referred to as the storage device 120). The processor 110 executes various processes. For example, the processor 110 includes a central processing unit (CPU). In the storage device 120, various pieces of information are stored. Examples of the storage device 120 include a volatile memory, a nonvolatile memory, a hard disk drive (HDD), a solid state drive (SSD), and the like. The control device 100 may include one or more electronic control units (ECU). The control device 100 may be partially an external information processing device provided outside the vehicle 1. In that case, part of the control device 100 communicates with the vehicle 1 and remotely controls the vehicle 1.

A vehicle control program PROG is a computer program for controlling the vehicle 1. When the processor 110 executes the vehicle control program PROG, various processes by the control device 100 are implemented. The vehicle control program PROG is stored in the storage device 120. Alternatively, the vehicle control program PROG may be stored in a computer-readable recording medium (storage medium).

3-2. Driving Environment Information

The processor 110 acquires driving environment information 200 indicative of a driving environment of the vehicle 1 by use of the sensor group 20. The driving environment information 200 is stored in the storage device 120.

FIG. 7 is a block diagram illustrating an example of the driving environment information 200. The driving environment information 200 includes surrounding state information 210, vehicle state information 220, map information 230, vehicle position information 240, weather information 250, and so on.

The surrounding state information 210 is information indicative of the surrounding state around the vehicle 1. The processor 110 recognizes the surrounding state around the vehicle 1 by use of the recognition sensor 21 and acquires the surrounding state information 210. For example, the surrounding state information 210 includes image information on an image captured by the camera. As another example, the surrounding state information 210 includes point group information to be provided by the LIDAR.

The surrounding state information 210 further includes object information 215 on an object around the vehicle 1. Examples of the object includes pedestrians, bicycles, other vehicles (a leading vehicle, a parked vehicle, and the like), road constituents (a white line, curb stone, a guard rail, a wall, a safety zone, a roadside structural object, and the like), marks, poles, obstacles, and so on. The object information 215 indicates a relative position and a relative speed of the object relative to the vehicle 1. For example, the object can be identified by analyzing image information acquired by the camera, and hereby, the relative position of the object can be calculated. Further, the object can be identified based on point group information acquired by the LIDAR, and hereby, the relative position and the relative speed of the object can be acquired. The object information may include a moving direction and a traveling speed of the object.

The vehicle state information 220 is information indicative of a state of the vehicle 1. The processor 110 acquires the vehicle state information 220 from the vehicle state sensor. The vehicle state information 220 may indicate a driving state (self-driving or manual driving) of the vehicle 1.

The map information 230 includes a general navigational map. The map information 230 may indicate a driving-lane arrangement, a road shape, and so on. The map information 230 may include position information on a landmark, a traffic light, a mark, and the like. The map information 230 may include the position of the safe area EA. The map information 230 may include the installation position of the magnetic marker M. The processor 110 acquires the map information 230 on a necessary area from a map database. The map database may be stored in a predetermined storage device provided in the vehicle 1 or may be stored in an external management server. In the latter case, the processor 110 communicates with the management server and acquires the necessary map information 230.

The vehicle position information 240 is information indicative of the position of the vehicle 1. The processor 110 acquires the vehicle position information 240 from a detection result from the position sensor. Further, the processor 110 may acquire highly accurate vehicle position information 240 by a well-known self-position estimation process (Localization) using the object information 215 and the map information 230.

The weather information 250 indicates a weather condition such as rain, snow, or fog. The weather information 250 may indicate an amount of rainfall, an amount of snowfall, a fog density, or the like. For example, the weather information 250 is provided by a weather information service system. The processor 110 acquires the weather information 250 from the weather information service system via communication. As another example, the processor 110 may acquire the weather information 250 based on the surrounding state information 210. For example, the processor 110 can acquire the weather information 250 by determining the weather by analyzing image information on an image captured by the camera.

3-3. Guidance Information

The magnetic marker M provides the guidance information 300 to the vehicle control system 10. For example, the magnetic marker M includes the RF tag in which the guidance information 300 is stored. The guidance information 300 stored in the RF tag is read out by the reader included in the magnetic sensor 30 on the vehicle 1 side. The guidance information 300 thus read out is stored in the storage device 120.

FIG. 8 is a schematic diagram illustrating one example of the guidance information 300. In the example illustrated in FIG. 8, the guidance information 300 includes identification information (ID) on the magnetic marker M, the installation position of the magnetic marker M, and the advancing direction and the distance from the installation position of the magnetic marker M to the safe area EA. The installation position of the magnetic marker M is defined by an absolute coordinate system. For example, the installation position of the magnetic marker M is defined by latitude and longitude. The advancing direction to the safe area EA is a moving direction for the vehicle 1 to reach the safe area EA.

Figure 9:
FIG. 9 is a schematic diagram illustrating another example of the guidance information according to the embodiment of this disclosure.

FIG. 9 is a schematic diagram illustrating another example of the guidance information 300. In the example illustrated in FIG. 9, the guidance information 300 includes the identification information (ID) on the magnetic marker M and the installation position of the magnetic marker M.

3-4. Vehicle Traveling Control, Self-Driving Control

The processor 110 executes the "vehicle traveling control" by which the traveling of the vehicle 1 is controlled. The vehicle traveling control includes a steering control, an acceleration control, and a deceleration control. The processor 110 executes the vehicle traveling control by controlling the travel device 40 (the steering device, the driving device, the braking device). More specifically, the processor 110 executes the steering control by controlling the steering device. Further, the processor 110 executes the acceleration control by controlling the driving device. Further, the processor 110 executes the deceleration control by controlling the braking device.

Further, the processor 110 executes the self-driving control based on the driving environment information 200. More particularly, the processor 110 generates a traveling plan of the vehicle 1 based on the driving environment information 200. Examples of the traveling plan include maintaining of a current driving lane, lane-changing, turning right or left, avoiding of an obstacle, and so on. Further, the processor 110 generates a target trajectory TR necessary for the vehicle 1 to travel along the traveling plan based on the driving environment information 200. The target trajectory TR includes a target position and a target speed. The processor 110 executes the vehicle traveling control such that the vehicle 1 follows the target trajectory TR.

3-5. Retreat Traveling Control

In response to the occurrence of an abnormality in at least part of the components and the functions necessary for the self-driving control, the processor 110 executes the retreat traveling control appropriately. In the retreat traveling control, the processor 110 causes the vehicle 1 to travel toward the safe area EA and stop at the safe area EA. For example, the processor 110 recognizes the current position of the vehicle 1 and the position of the safe area EA. Further, the processor 110 determines a retreat route and a target trajectory TR to the safe area EA based on the current position of the vehicle 1 and the position of the safe area EA. The processor 110 then executes the vehicle traveling control such that the vehicle 1 follows the retreat route and the target trajectory TR.

4. Example of Processing Flow

Figure 10:
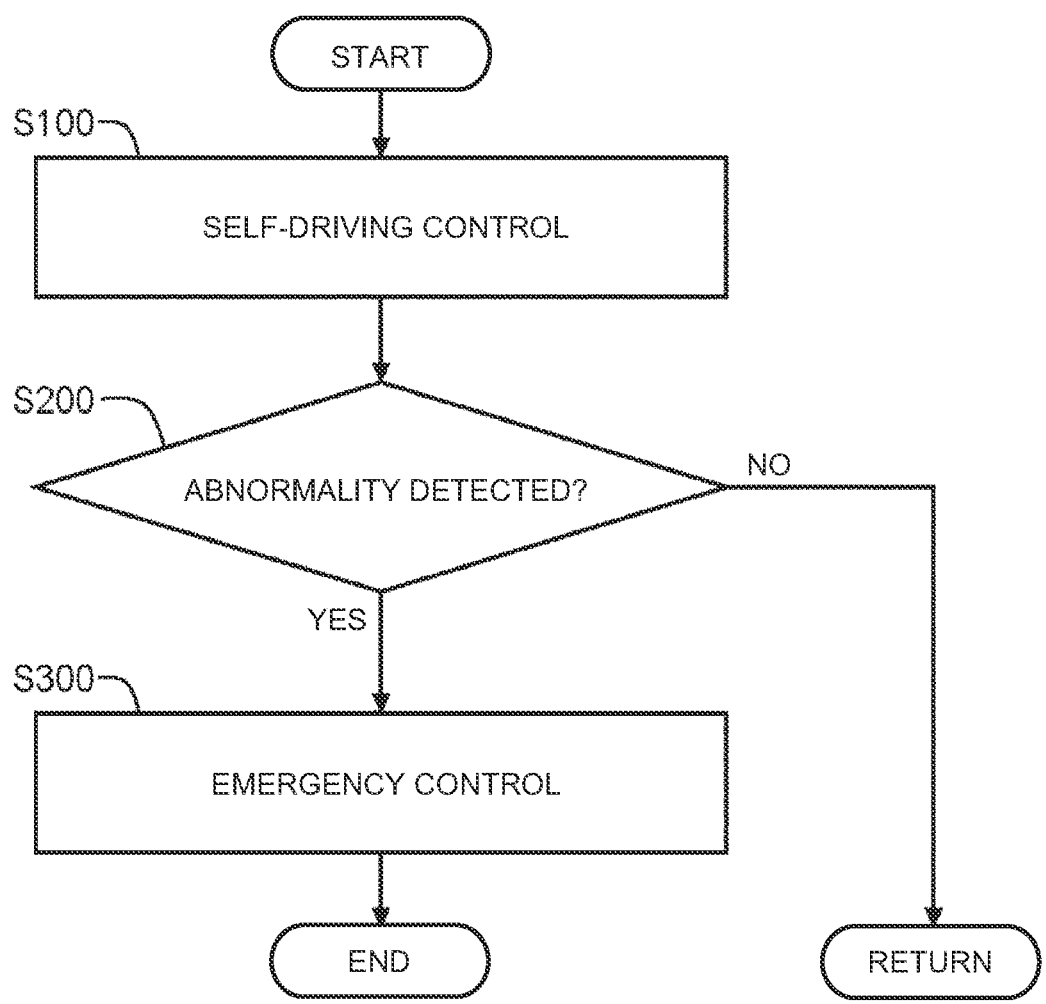
FIG. 10 is a flowchart illustrating an example of a process to be executed by the vehicle control system according to the embodiment of this disclosure.

FIG. 10 is a flowchart illustrating an example of a process to be executed by the vehicle control system 10 (the processor 110) according to the present embodiment.

In step S100, the processor 110 executes the self-driving control based on the driving environment information 200 (see Section 3-4).

In step S200, the processor 110 determines whether an abnormality occurs in at least part of the components and the functions necessary for the self-driving control or not. Examples of the components necessary for the self-driving control include the sensor group 20 such as the recognition sensor 21, the travel device 40, a power supply, and so on. Examples of the functions necessary for the self-driving control include the recognition process using the recognition sensor 21, the self-position estimation process (Localization) of acquiring the highly accurate vehicle position information 240, the generation of the target trajectory TR, and so on.

For example, the processor 110 has a failure diagnosis function and detects failure of each component by using the failure diagnosis function. As another example, each sensor of the sensor group 20 may detect the occurrence of failure by its own failure diagnosis function. The sensor that has detected the occurrence of failure transmits an error code to the processor 110. The processor 110 recognizes a sensor failure by receiving the error code. As further another example, in a case where the processor 110 does not receive an output signal from a sensor for a predetermined period of time, the processor 110 may determine that the sensor has a failure.

In a case where an abnormality is detected (step S200; Yes), the process proceeds to step S300. In step S300, the processor 110 executes an emergency control.

Figure 11:
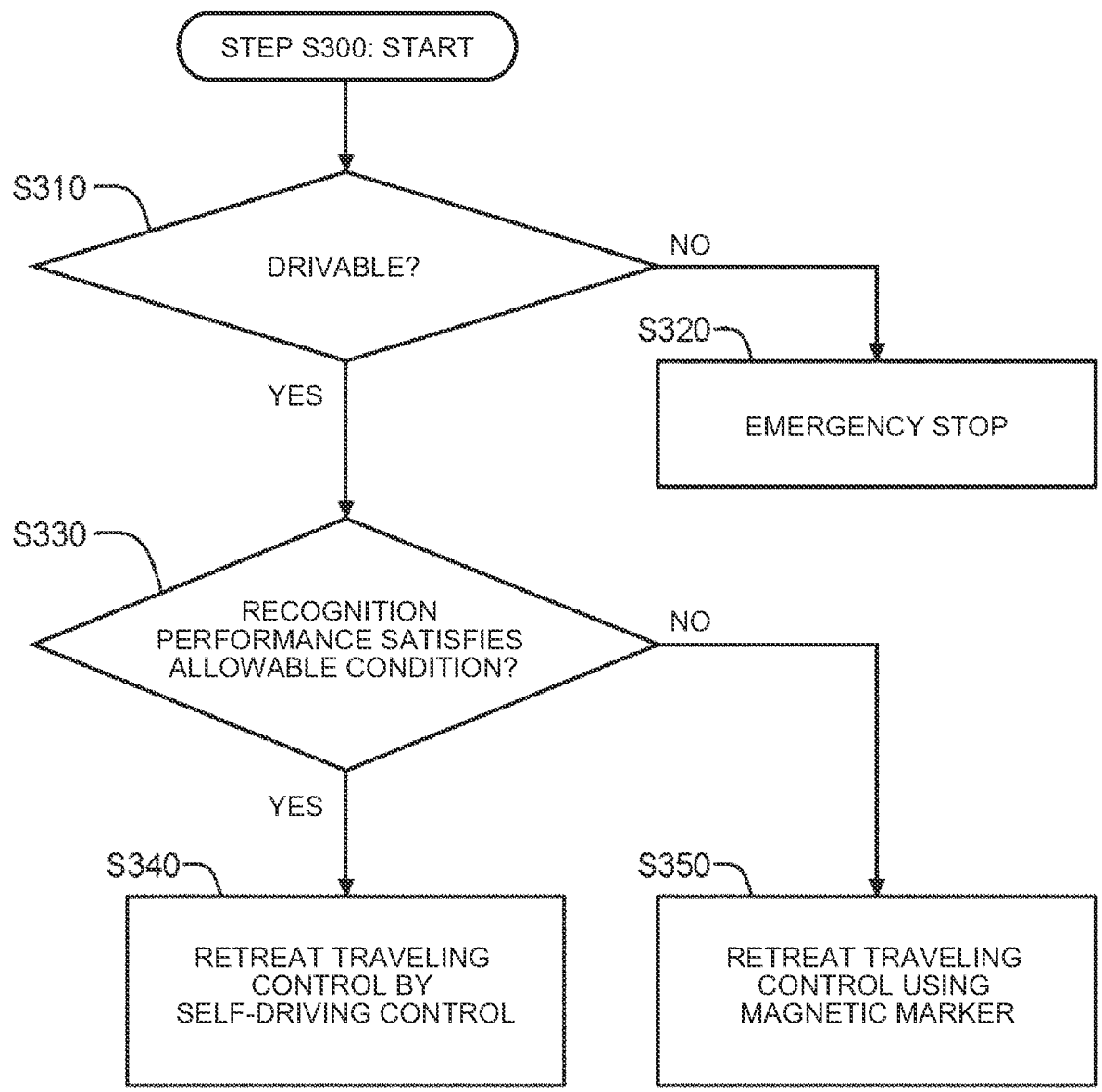
FIG. 11 is a flowchart illustrating one example of an emergency control (step S300) to be executed by the vehicle control system according to the embodiment of this disclosure.

FIG. 11 is a flowchart illustrating one example of the emergency control (step S300).

In step S310, the processor 110 determines whether the vehicle 1 is drivable or not. For example, in a case where the power supply has a failure, the vehicle 1 is not drivable. As another example, in a case where the travel device 40 has a failure, the vehicle 1 is not drivable. In the meantime, in a case where a sensor having a dual configuration has a single failure, the vehicle 1 is drivable. As another example, in a case where various types of the recognition sensors 21 partially breaks down, the vehicle 1 is drivable. In a case where the vehicle 1 is not drivable (step S310; No), the process proceeds to step S320. In the meantime, in a case where the vehicle 1 is drivable (step S310; Yes), the process proceeds to step S330.

In step S320, the processor 110 causes the vehicle 1 to perform emergency stop.

In step S330, the processor 110 determines whether retreat traveling using the magnetic marker M is necessary or not. For example, the processor 110 determines performance of the recognition process using the recognition sensor 21, that is, recognition performance satisfies an allowable condition or not. In a case where the recognition performance does not satisfy the allowable condition (step S330; No), the processor 110 determines that the retreat traveling using the magnetic marker M is necessary.

Various examples are considered as an acquisition method of the recognition performance as follows.

In a first example, the processor 110 acquires the recognition performance based on a result of the recognition process. For example, it is assumed that the position (absolute position) of a reference object is registered in the map information 230 in advance. Examples of the reference object include a traffic light, a mark, a pole, a white line, a guard rail, and so on. The object information 215 indicates a relative position of the reference object detected by the recognition process. By combining the object information 215 with the vehicle position information 240, it is possible to obtain an absolute position of the reference object detected by the recognition process. The processor 110 calculates a detection rate of the reference object by the recognition process by comparing the position of the reference object registered in the map information 230 with the position of the reference object detected by the recognition process. The processor 110 determines the recognition performance based on the calculated detection rate. For example, in a case where the detection rate is equal to or more a threshold, the processor 110 determines that the recognition performance is high and satisfies the allowable condition. In the meantime, in a case where the detection rate is less than the threshold, the processor 110 determines that the recognition performance is low and does not satisfy the allowable condition.

In a second example, the processor 110 acquires the recognition performance based on the type of object recognized by the recognition process. For example, in a case where at least a white line is recognized, the processor 110 determines that the recognition performance is equal to or more than a "low level." In a case where at least an object ahead of the vehicle 1 is recognized, the processor 110 determines that the recognition performance is equal to or more than an "intermediate level." In a case where objects in the whole directions around the vehicle 1 are recognized, the processor 110 determines that the recognition performance is a "high level." In a case where the recognition performance is equal to or more than the "intermediate level," the processor 110 determines that the recognition performance satisfies the allowable condition.

In a third example, the processor 110 acquires the recognition performance based on the weather information 250. In a case of fine weather, for example, the processor 110 determines that the recognition performance is high and satisfies the allowable condition. In a case where a heavy weather index (e.g., an amount of rainfall, an amount of snowfall, or a fog density) exceeds a threshold, the processor 110 determines that the recognition performance is low and does not satisfy the allowable condition.

In a case where the recognition performance satisfies the allowable condition (step S330; Yes), the process proceeds to step S340. In the meantime, in a case where the recognition performance does not satisfy the allowable condition (step S330; No), the process proceeds to step S350.

In step S340, the processor 110 executes the retreat traveling control by executing the self-driving control based on the driving environment information 200. For example, the processor 110 sets a nearest bus stop BS (see FIG. 5) as the safe area EA. The position of the bus stop BS is registered in the map information 230. The processor 110 executes the self-driving control based on the driving environment information 200 such that the vehicle 1 travels to the bus stop BS and stops at the bus stop BS. Note that, during the execution of the retreat traveling control, the vehicle speed may be restrained to a predetermined upper limit or less. At the start of the retreat traveling control, the processor 110 may decelerate the vehicle 1.

In step S350, the processor 110 executes the retreat traveling control using the magnetic markers M.

Figure 12:
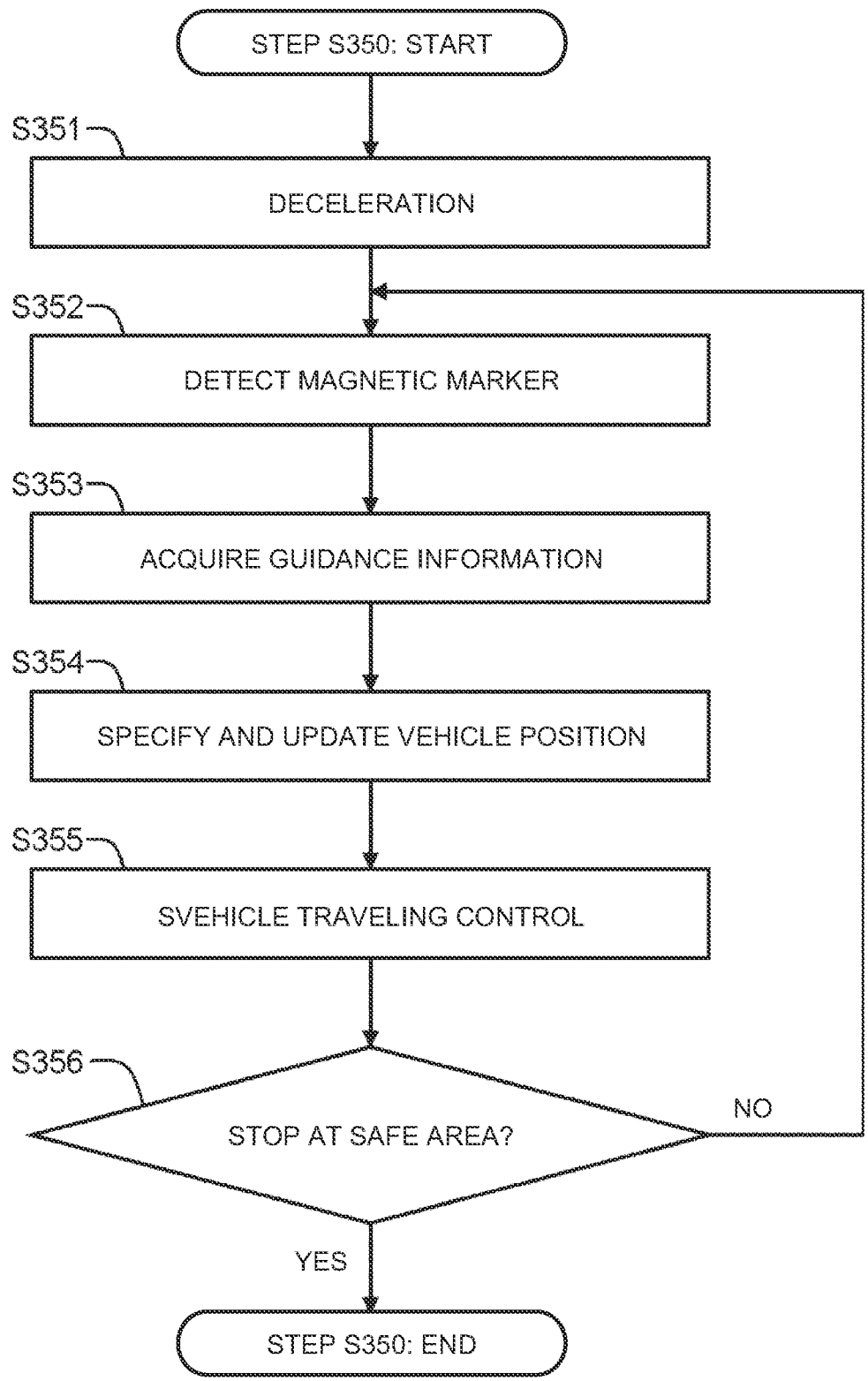
FIG. 12 is a flowchart illustrating one example of a retreat traveling control (step S350) using the magnetic markers according to the embodiment of this disclosure.

FIG. 12 is a flowchart illustrating one example of the retreat traveling control (step S350) using the magnetic markers M.

In step S351, the processor 110 executes the deceleration control and decelerates the vehicle 1. Further, during the execution of the retreat traveling control, the processor 110 restrains the vehicle speed to the predetermined upper limit or less.

The processor 110 executes the self-driving control based on the driving environment information 200 within a possible range until a first magnetic marker M is detected. For example, under the situation where the recognition performance does not satisfy the allowable condition, the accuracy of the self-position estimation process also decreases. Accordingly, the processor 110 may acquire the vehicle position information 240 by use of the GPS sensor. The processor 110 may estimate a vehicle position based on the vehicle state information 220 (a vehicle speed, a steering angle).

In step S352, the processor 110 detects the magnetic marker M by the magnetic sensor 30. In a case where the magnetic marker M is detected by the magnetic sensor 30, a lateral position deviation between the magnetic sensor 30 and the magnetic marker M can be found from the direction of the direction of the magnetic marker M viewed from the magnetic sensor 30. The processor 110 may steer the vehicle 1 to a direction where the lateral position deviation decreases.

In step S353, the processor 110 acquires the guidance information 300 (see FIGS. 8, 9) from the detected magnetic marker M.

In step S354, the processor 110 specifies and updates the position of the vehicle 1. More specifically, the guidance information 300 includes the installation position of the magnetic marker M. The installation position of the magnetic sensor 30 in the vehicle 1 is known. Accordingly, the processor 110 can highly accurately specify the position of the vehicle 1 based on the installation position of the detected magnetic marker M.

In step S355, the processor 110 causes the vehicle 1 to travel toward the safe area EA and stop at the safe area EA.

For example, the map information 230 indicates the position of the safe area EA. The processor 110 recognizes a nearest safe area EA based on the current position of the vehicle 1 and the map information 230 and determines a retreat route and a target trajectory TR to the safe area EA. The processor 110 then executes the vehicle traveling control such that the vehicle 1 follows the retreat route and the target trajectory TR.

As another example, the guidance information 300 may include an advancing direction and a distance from the installation position of the magnetic marker M to the safe area EA (see FIG. 8). In this case, the processor 110 can cause the vehicle 1 to travel toward the safe area EA and stop at the safe area EA based on at least the advancing direction and the distance to the safe area EA.

As further another example, the processor 110 may determine the retreat route and the target trajectory TR to the safe area EA based on the current position of the vehicle 1 and the advancing direction and the distance to the safe area EA. The processor 110 may also refer to the map information 230 and determine the retreat route and the target trajectory TR to the safe area EA. The processor 110 executes the vehicle traveling control such that the vehicle 1 follows the retreat route and the target trajectory TR.

The abovementioned process is repeated until the vehicle 1 stops at the safe area EA. When the vehicle 1 stops at the safe area EA (step S356; Yes), the retreat traveling control is ended.

What is claimed is:

1. A vehicle control system applied to a vehicle equipped with a magnetic sensor configured to detect a plurality of magnetic markers on a road, the vehicle control system comprising one or more processors configured to execute a self-driving control by which self-driving of the vehicle is controlled, wherein:

in response to occurrence of an abnormality in at least part of components and functions necessary for the self-driving control, the one or more processors execute a retreat traveling control using the plurality of magnetic markers;

the plurality of magnetic markers provide guidance information by which the vehicle is guided to a safe area; and in the retreat traveling control using the plurality of magnetic markers, the one or more processors acquire the guidance information from the plurality of magnetic markers detected by the magnetic sensor and cause the vehicle to travel toward the safe area and stop at the safe area based on the guidance information thus acquired, wherein:

the plurality of magnetic markers are discontinuously placed along a retreat route by which the vehicle is guided to the safe area;

the plurality of magnetic markers include a magnet and a radio frequency tag that stores the guidance information;

a first installation interval between the plurality of magnetic markers inside and around the safe area is smaller than a second installation interval between the plurality of magnetic markers on the road other than the safe area;

the one or more processors perform a recognition process of recognizing a surrounding state around the vehicle by use of a recognition sensor provided in the vehicle and execute the self-driving control based on a result of the recognition process; and in a case where the vehicle is drivable but performance of the recognition process does not satisfy an allowable condition, the one or more processors determines that the retreat traveling control using the plurality of magnetic markers is necessary, the allowable condition including a calculated detection rate of a reference object relative to a first threshold value, a determination that the performance is greater than or equal to a specified level based on an object type, or that the performance is of a predetermined degree relative to a second threshold value associated with weather conditions.

2. The vehicle control system according to claim 1, wherein:
the guidance information includes an advancing direction and a distance from an installation position of the plurality of magnetic markers to the safe area; and
the one or more processors execute the retreat traveling control based on the advancing direction and the distance to the safe area.

3. The vehicle control system according to claim 2, wherein:
the guidance information further includes the installation position of the plurality of magnetic markers;
the one or more processors specify a position of the vehicle based on the installation position of the plurality of magnetic markers detected by the magnetic sensor; and
the one or more processors execute the retreat traveling control based on the position of the vehicle and the advancing direction and the distance to the safe area.

4. The vehicle control system according to claim 3, wherein the guidance information further includes identification information on the plurality of the markers.

5. The vehicle control system according to claim 1, further comprising one or more storage devices in which map information indicative of a position of the safe area is stored, wherein:
the guidance information includes an installation position of the plurality of magnetic markers;
the one or more processors specify a position of the vehicle based on the installation position of the plurality of magnetic markers detected by the magnetic sensor; and
the one or more processors execute the retreat traveling control based on the position of the vehicle and the map information.

6. The vehicle control system according to claim 1, further comprising the magnetic sensor, wherein:
the magnetic sensor is provided on a first side of the vehicle; and
the first side is a left side in an area of left-hand traffic, or the first side is a right side in an area of right-hand traffic.

7. The vehicle control system according to claim 1, wherein the one or more processors further:
limit a vehicle speed to a predetermined upper limit or less during execution of the retreat traveling control; and
execute, in response to detecting the abnormality, an emergency control based on determining whether the vehicle is drivable or not.

8. A vehicle control method for controlling a vehicle equipped with a magnetic sensor configured to detect a plurality of magnetic markers on a road, the vehicle control method comprising:
a process of executing a self-driving control by which self-driving of the vehicle is controlled; and
a process of executing a retreat traveling control using the plurality of magnetic markers in response to occurrence of an abnormality in at least part of components and functions necessary for the self-driving control, wherein:
the plurality of magnetic markers provide guidance information by which the vehicle is guided to a safe area; and
the retreat traveling control using the plurality of magnetic markers includes:
a process of acquiring the guidance information from the plurality of magnetic markers detected by the magnetic sensor, and
a process of causing the vehicle to travel toward the safe area and stop at the safe area based on the guidance information thus acquired, wherein:
the plurality of magnetic markers are discontinuously placed along a retreat route by which the vehicle is guided to the safe area;
the plurality of magnetic markers include a magnet and a radio frequency tag that stores the guidance information;
a first installation interval between the plurality of magnetic markers inside and around the safe area is smaller than a second installation interval between the plurality of magnetic markers on the road other than the safe area;
a process of performing a recognition process of recognizing a surrounding state around the vehicle by use of a recognition sensor provided in the vehicle and a process of executing the self-driving control based on a result of the recognition process; and
in a case where the vehicle is drivable but performance of the recognition process does not satisfy an allowable condition, a process of determining that the retreat traveling control using the plurality of magnetic markers is necessary, the allowable condition including a calculated detection rate of a reference object relative to a first threshold value, a determination that the performance is greater than or equal to a specified level based on an object type, or that the performance is of a predetermined degree relative to a second threshold value associated with weather conditions.

9. A non-transitory storage medium storing a vehicle control program to be executed by a computer, the vehicle control program being for controlling a vehicle equipped with a magnetic sensor configured to detect a plurality of magnetic markers on a road, the vehicle control program causing the computer to execute:
- a process of executing a self-driving control by which self-driving of the vehicle is controlled; and
- a process of executing a retreat traveling control using the plurality of magnetic markers in response to occurrence of an abnormality in at least part of components and functions necessary for the self-driving control, wherein:

the plurality of magnetic markers provide guidance information by which the vehicle is guided to a safe area; and the retreat traveling control using the plurality of magnetic markers includes:
- a process of acquiring the guidance information from the plurality of magnetic markers detected by the magnetic sensor, and
- a process of causing the vehicle to travel toward the safe area and stop at the safe area based on the guidance information thus acquired, wherein:

the plurality of magnetic markers are discontinuously placed along a retreat route by which the vehicle is guided to the safe area;

the plurality of magnetic markers include a magnet and a radio frequency tag that stores the guidance information;

a first installation interval between the plurality of magnetic markers inside and around the safe area is smaller than a second installation interval between the plurality of magnetic markers on the road other than the safe area;

a process of performing a recognition process of recognizing a surrounding state around the vehicle by use of a recognition sensor provided in the vehicle and a process of executing the self-driving control based on a result of the recognition process; and in a case where the vehicle is drivable but performance of the recognition process does not satisfy an allowable condition, a process of determining that the retreat traveling control using the plurality of magnetic markers is necessary, the allowable condition including a calculated detection rate of a reference object relative to a first threshold value, a determination that the performance is greater than or equal to a specified level based on an object type, or that the performance is of a predetermined degree relative to a second threshold value associated with weather conditions.

* * * * *